United States Patent
Nishida et al.

(10) Patent No.: US 10,501,635 B2
(45) Date of Patent: Dec. 10, 2019

(54) MAGNESIUM OXIDE POWDER, RESIN COMPOSITION INCLUDING SAME, AND METHOD FOR PRODUCING MAGNESIUM OXIDE POWDER

(71) Applicant: Ube Material Industries, Ltd., Ube-shi, Yamaguchi (JP)

(72) Inventors: Naoto Nishida, Ube (JP); Tatsuki Okutsu, Ube (JP); Naoki Funabashi, Ube (JP); Akira Yoshida, Ube (JP)

(73) Assignee: UBE MATERIAL INDUSTRIES, LTD., Ube-shi, Yamaguchi (JP)

( * ) Notice: Subject to any disclaimer, the term of this patent is extended or adjusted under 35 U.S.C. 154(b) by 25 days.

(21) Appl. No.: 15/554,472

(22) PCT Filed: Mar. 2, 2016

(86) PCT No.: PCT/JP2016/056344
§ 371 (c)(1),
(2) Date: Aug. 30, 2017

(87) PCT Pub. No.: WO2016/147862
PCT Pub. Date: Sep. 22, 2016

(65) Prior Publication Data
US 2018/0044530 A1    Feb. 15, 2018

(30) Foreign Application Priority Data

Mar. 16, 2015   (JP) ................. 2015-052468

(51) Int. Cl.

| | |
|---|---|
| C09C 1/02 | (2006.01) |
| C01F 5/08 | (2006.01) |
| C08K 3/22 | (2006.01) |
| C08K 3/26 | (2006.01) |
| C08K 9/02 | (2006.01) |
| C09C 3/06 | (2006.01) |
| C01F 5/02 | (2006.01) |
| C01F 5/14 | (2006.01) |
| C01F 5/24 | (2006.01) |

(52) U.S. Cl.
CPC .............. *C09C 1/028* (2013.01); *C01F 5/02* (2013.01); *C01F 5/08* (2013.01); *C01F 5/14* (2013.01); *C01F 5/24* (2013.01); *C08K 3/22* (2013.01); *C08K 3/26* (2013.01); *C08K 9/02* (2013.01); *C09C 3/063* (2013.01); *C01P 2002/70* (2013.01); *C01P 2004/04* (2013.01); *C01P 2004/61* (2013.01); *C01P 2004/62* (2013.01); *C01P 2004/80* (2013.01); *C01P 2004/84* (2013.01); *C01P 2006/10* (2013.01); *C01P 2006/62* (2013.01); *C01P 2006/63* (2013.01); *C01P 2006/64* (2013.01); *C08K 2003/222* (2013.01); *C08K 2003/267* (2013.01); *C08K 2201/005* (2013.01)

(58) Field of Classification Search
None
See application file for complete search history.

(56) References Cited

U.S. PATENT DOCUMENTS

2014/0235753 A1   8/2014   Suzuki et al.

FOREIGN PATENT DOCUMENTS

| | | |
|---|---|---|
| JP | 7-315914 A | 12/1995 |
| JP | 2003-34522 A | 2/2003 |
| JP | 2006-249052 A | 9/2006 |
| JP | 2008-74683 A | 4/2008 |
| WO | 2013/024740 A1 | 2/2013 |
| WO | 2014/119462 A1 | 8/2014 |

OTHER PUBLICATIONS

Machine Translation of JP 2006 249052A p. 1-5, Mar. 2005.*
Datasheet for Magnesium Carbonate Hydroxide Hydrate https://www.lobachemie.com/Inorganic-Salts-04465/MAGNESIUM-CARBONATE-BASIC-LIGHT-CASNO-39409-82-0.aspx, 2 pages.*
Datasheet for Magnesium Carbonate Hydroxide Hydrate, American Elements, pp. 1-2, Jul. 29, 2019. (Year: 2019).*
International Search Report dated Apr. 5, 2016, issued in counterpart application No. PCT/JP2016/056344. (2 pages).

* cited by examiner

*Primary Examiner* — Robert T Butcher
(74) *Attorney, Agent, or Firm* — Westerman, Hattori, Daniels & Adrian, LLP

(57) ABSTRACT

To provide magnesium oxide which is excellent in hydration resistance and hardly causes volume expansion due to hydration and the like, a resin composition containing the same, and a method for producing the magnesium oxide powder.

Magnesium oxide powder having a coating layer mainly comprising basic magnesium carbonate in the surface layer, when the amounts of substances of water vapor and carbon dioxide among the gas generated by thermal decomposition at 50 to 500° C. are respectively designated as m-$H_2O$ and m-$CO_2$, in a heating evolved gas analysis (EGA-MS) method, the molar fraction represented by m-$CO_2$/(m-$H_2O$+ m-$CO_2$) being within the range of 0.3 to 0.6.

8 Claims, 1 Drawing Sheet

MAGNESIUM OXIDE POWDER, RESIN COMPOSITION INCLUDING SAME, AND METHOD FOR PRODUCING MAGNESIUM OXIDE POWDER

TECHNICAL FIELD

The present invention relates to magnesium oxide powder, a resin composition containing the same, and a method for producing the magnesium oxide powder, and in particular, to magnesium oxide powder excellent in hydration resistance, a resin composition containing the same, and a method for producing the magnesium oxide powder.

BACKGROUND ART

Magnesium oxide is an inorganic compound excellent in heat conductivity, heat resistance and the like, and can be mixed to various resins and used as a heat conductive filler for improving the thermal conductivity and fire resistance of a resin composition or a resin molded article obtained by molding the same. In molded articles obtained by immobilizing magnesium oxide powder with a binder such as monolithic refractories, molded articles of a resin kneaded matter obtained by filling the resin with magnesium oxide as a filler and the like, weather resistance and shape stability are influenced by volume stability of magnesium oxide forming them.

The reason for the poor volume stability of magnesium oxide is that the magnesium oxide undergoes a hydration reaction to become magnesium hydroxide, and the volume change (expansion) occurs at this time. That is, since magnesium oxide has a relatively high hydration property, the volume tends to expand due to water absorption to cause cracking of the resin, which has been an obstacle for putting magnesium oxide into practical use as a thermally conductive filler. Therefore, when magnesium oxide is used as a thermally conductive filler, a technique for enhancing hydration resistance has been required.

Conventionally, in order to enhance the hydration resistance of magnesium oxide, a technique for coating the surface of magnesium oxide with a surface treatment agent such as silica or phosphoric acid has been known. However, such a coating technique requires a treatment cost because a surface treatment agent is used.

On the other hand, a technique for improving the hydration resistance of magnesium oxide without using a surface treatment agent is also known. For example, Patent Literature 1 describes high purity magnesia clinker in which the surface of the particles of magnesia clinker is covered with fine crystals of magnesium hydroxide, thus digestion of periclase by water vapor in water or air is suppressed (that is, excellent in hydration resistance). Moreover, it is described in the examples and comparative examples of this literature that the magnesia clinker is sized, then added with water, and kept in a thermostat at a predetermined temperature, but in either example, the temperature is 30° C. (Example 1, and the like), or 60° C. or more (Example 4, and the like).

Incidentally, although it relates to magnesium oxide particles for tablet production, Patent Literature 2 describes magnesium oxide particles of which surface is covered with a coating layer including magnesium hydroxide and/or magnesium carbonate. Further, it is also described that the magnesium oxide particles are produced by bringing water vapor or a mixed gas of water vapor and carbon dioxide gas into contact with magnesium oxide particles. Also, in the examples of this literature, a coating layer is formed by introducing steam into the magnesium oxide particles and holding at 95° C. for 2 hours, or a coating layer is formed by introducing steam and holding at 90° C., then introducing carbon dioxide gas and holding for 3 hours.

CITATION LIST

Patent Literature

Patent Literature 1: JP H7-315914 A (claim 1, paragraphs 0011 to 0022, and the like)
Patent Literature 2: JP 2006-249052 A (claim 1, claim 2, paragraph 0017, paragraph 0021, and the like)

SUMMARY OF INVENTION

Technical Problem

In Patent Literature 1 and Patent Literature 2, magnesium oxide is reacted in the presence of carbon dioxide (also including those contained in the air) and water (water vapor), thereby a coating layer including a reaction product of magnesium oxide, carbon dioxide and water is formed on the surface. As a result, the surface of the magnesium oxide is protected by the coating layer, and the hydration resistance is improved.

In some examples of Patent Literature 1 and Patent Literature 2, magnesium oxide is reacted under a high temperature condition of 60° C. or more. Under such conditions, it is assumed that much magnesium carbonate trihydrate ($MgCO_3.3H_2O$) or magnesium hydroxide is formed on the surface of the magnesium oxide, as described in the embodiment described later. On the other hand, in some examples of Patent Literature 1, magnesium oxide is mixed with water and then reacted at 30° C. Under such conditions, it is assumed that much magnesium hydroxide is formed on the surface of the magnesium oxide, as described in the embodiment described later. Also, even magnesium oxide powder obtained under any of the reaction conditions does not have sufficient hydration resistance, and therefore magnesium oxide powder having better hydration resistance has been required.

An object of the present invention is to provide magnesium oxide powder excellent in hydration resistance and a resin composition containing the same. Also, another object of the present invention is to provide a production method capable of producing magnesium oxide powder excellent in hydration resistance even without treatment with a special surface treatment agent.

Solution to Problem

As a result of intensive studies to achieve the above objects, the present inventors have found that a coating layer of basic magnesium carbonate rather than magnesium carbonate trihydrate and magnesium hydroxide significantly improves the hydration resistance of magnesium oxide. Then, it was found that a coating layer almost composed only of basic magnesium carbonate can be formed by setting the temperature and humidity conditions of the magnesium oxide raw material within a predetermined range, thereby completing the present invention.

More specifically, the present invention is magnesium oxide powder having a coating layer mainly including basic magnesium carbonate in the surface layer, when the amounts of substances of water vapor and carbon dioxide among the gas generated by thermal decomposition at 50 to 500° C. are respectively designated as m-$H_2O$ and m-$CO_2$, in a heating evolved gas analysis (EGA-MS) method, the molar fraction represented by m-$CO_2$/(m-$H_2O$+m-$CO_2$) being within the range of 0.3 to 0.6.

Also, the present invention is magnesium oxide powder having a coating layer mainly including basic magnesium carbonate in the surface layer, which is obtained by treating a magnesium oxide raw material, in the presence of carbon dioxide, at 30 to 50° C. and an atmosphere of relative humidity of 70 to 90% for 10 to 1000 hours.

In these cases, the average particle size is preferably within the range of 0.1 to 300 μm.

Further, the present invention is a resin composition containing any one of the magnesium oxide powder described above.

Furthermore, the present invention provides a method for producing magnesium oxide powder having a coating layer mainly including basic magnesium carbonate in the surface layer, including treating a magnesium oxide raw material, in the presence of carbon dioxide, at 30 to 50° C. and an atmosphere of relative humidity of 70 to 90% for 10 to 1000 hours.

In this case, the purity of the magnesium oxide raw material is preferably 95% or more.

Advantageous Effects of Invention

According to the present invention, since the coating layer including basic magnesium carbonate is formed on the surface layer of the magnesium oxide, the hydration resistance of the magnesium oxide particles is excellent, and volume expansion due to hydration and the like hardly occur. Further, according to the resin composition of the present invention, since such magnesium oxide powder excellent in hydration resistance is contained, volume expansion of the magnesium oxide particles and the like hardly occur, thus cracking of the resin molded article is also less likely to occur.

Furthermore, according to the present invention, it is possible to provide a production method capable of producing such magnesium oxide particles excellent in hydration resistance.

DESCRIPTION OF EMBODIMENTS

1. Magnesium Oxide Powder

Figure 1A:
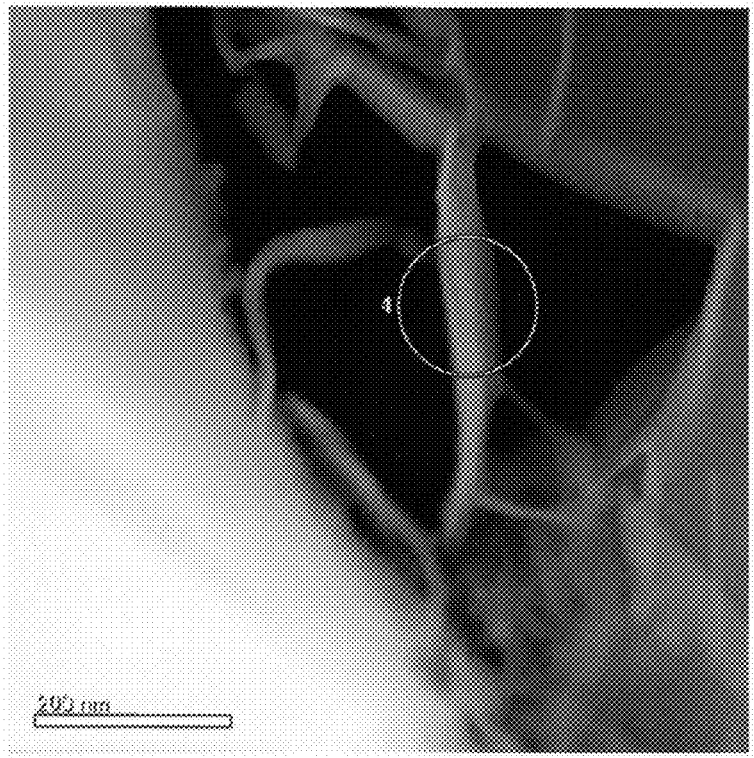
FIG. 1A is a dark field photograph of magnesium oxide powder of Example 1 taken by a scanning transmission electron microscope.

The magnesium oxide powder of the present invention (hereinafter, sometimes simply referred to as "magnesium oxide powder") is magnesium oxide powder having a coating layer mainly including basic magnesium carbonate in the surface layer. Further, in the magnesium oxide powder, when the amounts of substances of water vapor and carbon dioxide among the gas generated by thermal decomposition at 50 to 500° C., the amounts of water vapor and carbon dioxide are respectively designated as m-$H_2O$ and m-$CO_2$, in a heating evolved gas analysis (EGA-MS) method, the molar fraction represented by m-$CO_2$/(m-$H_2O$+m-$CO_2$) is within the range of 0.3 to 0.6. Hereinafter, details of the magnesium oxide powder will be described.

(1) Magnesium Oxide Raw Material

The magnesium oxide powder (hereinafter, referred to as "magnesium oxide raw material") used as a raw material of the magnesium oxide powder of the present invention can be obtained by an oxidation method by burning metal magnesium, a thermal decomposition method by burning a magnesium salt such as magnesium hydroxide, magnesium carbonate, magnesium chloride, magnesium nitrate or magnesium sulfate, or the like. As the magnesium hydroxide, those precipitated by the reaction between a magnesium salt in sea water and calcium hydroxide and the like can be used. Also, as the magnesium carbonate, magnesite ore and the like can be used. The burned conditions of magnesium hydroxide and magnesium carbonate are not particularly limited, and the burned temperature is within the range of generally 1300° C. or more, preferably 1300° C. to 2800° C., and more preferably 1400 to 2400° C., and the burned time is within the range of 10 minutes to 10 hours. As the magnesium oxide raw material, either a high-temperature burned product or an electro-fused product can be used. Further, the magnesium oxide raw material can also be used by adjusting to a predetermined particle size by pulverization/classification.

The particle shape of the magnesium oxide raw material is not particularly limited, and polyhedral shapes such as spherical, cubic, rectangular parallelepiped, octahedral and tetradecahedral, amorphous, and fibrous ones can be appropriately used. The purity of the magnesium oxide raw material is preferably 95% by mass or more, more preferably 98% by mass or more, and particularly preferably 99% by mass or more. Examples of impurities contained in the magnesium oxide raw material include calcium oxide, silicon dioxide, aluminum(III) oxide, iron(III) oxide, boric oxide, and the like.

The average particle size of the magnesium oxide raw material is not particularly limited, but the average particle size determined by a laser diffraction/scattering method is preferably within the range of 0.1 to 300 μm, and particularly preferably within the range of 1 to 100 μm. When the particle size is too large, the appearance and the smoothness of the surface tend to be adversely affected in the case of being filled in a resin or the like, and when the particle size is too small, the hydration resistance tends to deteriorate.

(2) Coating Layer

A coating layer is formed on the surface layer of the particles of the magnesium oxide powder. The coating layer of the present invention contains basic magnesium carbonate as a main component. This means that the coating layer contains almost no basic ingredient other than basic magnesium carbonate and almost solely includes basic magnesium carbonate.

Basic magnesium carbonate has the composition represented by the following chemical formula (1).

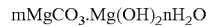

mMgCO$_3$·Mg(OH)$_2$·nH$_2$O  Chemical Formula (1)

wherein m is an integer of 3 to 5, and n is an integer of 3 to 8

The values of m and n are not particularly limited because they are different depending on the reaction conditions, but m=4 and n=5 are preferable since the hydration resistance is high.

The outer shape of the coating layer mainly including basic magnesium carbonate is scaly. The layer thickness of the coating layer is not particularly limited, but is usually within the range of 1 to 500 nm, and particularly within the range of 10 to 100 nm. When the layer thickness of the coating layer is less than 1 nm, the hydration resistance tends to be low, and those having a layer thickness of more than 500 nm deteriorate properties as magnesium oxide, for example, thermal conductivity.

(3) Magnesium Oxide Powder (Magnesium Oxide Powder Having Coating Layer in Surface Layer)

The average particle size of the magnesium oxide powder is not particularly limited, and the average particle size determined by the above-described laser diffraction/scattering method is preferably within the range of 0.1 to 300 μm, more preferably within the range of 1 to 100 μm, and particularly preferably 5 to 50 μm. When the average particle size is less than 0.1 μm, when it is mixed with a resin to form a resin composition, the viscosity tends to increase, and the handling property tends to deteriorate. On the other hand, when the average particle size exceeds 300 μm, the particle size is too large, thus the appearance of the resin molded article tends to be impaired. The particle size of the magnesium oxide powder may be adjusted by combining crushing and classification.

The BET specific surface area of the magnesium oxide powder is not particularly limited, and is usually 0.01 to 20 $m^2/g$, preferably 0.03 to 10 $m^2/g$, and more preferably 0.1 to 3 $m^2/g$. When the BET specific surface area is less than 0.01 $m^2/g$, the particle size is too large, and when it exceeds 20 $m^2/g$, the specific surface area becomes too large, and the hydration resistance tends to deteriorate.

The content of magnesium oxide contained in the magnesium oxide powder is preferably 95% by mass or more, more preferably 98% by mass or more, and particularly preferably 99% by mass or more. Examples of impurities contained in the magnesium oxide powder include calcium oxide, silicon dioxide, aluminum(III) oxide, iron(III) oxide, boron oxide, and the like.

Whether or not the coating layer mainly includes basic magnesium carbonate can be evaluated by a scanning transmission electron microscope and an identification method by electron beam diffraction, with respect to the magnesium oxide powder. When magnesium oxide raw material is reacted with carbon dioxide and water, magnesium oxide, magnesium hydroxide, magnesium carbonate trihydrate and basic magnesium carbonate can be generated, and it can be identified by electron beam diffraction using a scanning transmission electron microscope.

Also, whether or not the coating layer mainly includes basic magnesium carbonate can be evaluated by analyzing the components of the magnesium oxide powder by a heating evolved gas analysis (EGA-MS) method. Furthermore, in the EGA-MS method, the composition of basic magnesium carbonate can also be analyzed. Details of the evaluation by the EGA-MS method will be described below.

When the basic magnesium carbonate of the above chemical formula (1) is heated at a high temperature, carbon dioxide and water are generated by the reaction represented by the following chemical formula (2).

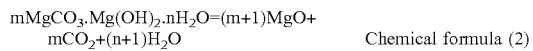

$mMgCO_3 \cdot Mg(OH)_2 \cdot nH_2O = (m+1)MgO + mCO_2 + (n+1)H_2O$    Chemical formula (2)

Therefore, it is possible to evaluate whether or not basic magnesium carbonate is produced by quantitatively determining carbon dioxide and water generated by heating the magnesium oxide powder by the EGA-MS method, and in the case where it is produced, what kind of composition can be known.

In the magnesium oxide powder of the present invention, when the amounts of substances of water vapor and carbon dioxide among the gas generated by thermal decomposition at 50 to 500° C. are respectively designated as m-$H_2O$ and m-$CO_2$, in a heating evolved gas analysis (EGA-MS) method, the molar fraction represented by m-$CO_2$/(m-$H_2O$+m-$CO_2$) is within the range of 0.3 to 0.6. When the molar fraction is less than 0.3, the main component of the coating layer is magnesium hydroxide, thus the hydration resistance is lowered. On the other hand, when the molar fraction exceeds 0.6, the main component of the coating layer is magnesium carbonate trihydrate, thus the hydration resistance is lowered.

The magnesium oxide powder has high hydration resistance, and while it also depends on the production method, specifically, the mass increase rate represented by the following formula (2) after holding at a temperature of 152° C., 0.5 MPa and a humidity of 100% for 3 hours is 5% by mass or less, preferably 4% by mass or less, and particularly preferably 3% by mass or less.

Mass increase rate=(Mass increase amount of magnesium oxide powder after holding/Mass of magnesium oxide powder before holding)×100 (%)    Formula (2)

2. Method for Producing Magnesium Oxide Powder

The magnesium oxide powder of the present invention can be produced by performing the steps of preparing magnesium oxide powder and reacting the magnesium oxide powder with carbon dioxide and water (reaction step). The surface layer of the magnesium oxide powder is modified into a coating layer by the reaction step. The carbon dioxide used herein may be carbon dioxide contained in the air or condensed carbon dioxide gas.

The reaction temperature is preferably within the range of 30 to 50° C., and particularly preferably within the range of 35 to 45° C. When the reaction temperature exceeds 50° C., magnesium hydroxide and magnesium carbonate trihydrate are likely to be generated. On the other hand, when the reaction temperature is lower than 30° C., the reaction between the magnesium oxide raw material and carbon dioxide hardly progresses, and basic magnesium carbonate is less likely to be generated.

The relative humidity is preferably within the range of 70 to 90%, and particularly preferably within the range of 80 to 85%. When the relative humidity is lower than 70%, water of the reaction system is too little, thus basic magnesium carbonate is less likely to be generated. On the other hand, when the relative humidity exceeds 90%, water of the reaction system is too much, thus much magnesium hydroxide tends to be generated.

The reaction time is preferably within the range of 10 to 1000 hours, and particularly preferably within the range of 50 to 500 hours. When the reaction time is less than 10 hours, the reaction of the magnesium oxide raw material is insufficient, and basic magnesium carbonate is less likely to be generated. On the other hand, when the reaction time exceeds 1000 hours, the reaction of the magnesium oxide raw material becomes excessive, the film thickness of the coating layer becomes too thick, and the properties as magnesium oxide, for example, thermal conductivity, are lowered.

The reaction of the magnesium oxide raw material can be carried out using a known thermo-hygrostat. The magnesium oxide raw material is placed in a thermo-hygrostat, and the reaction is allowed to proceed by maintaining the reaction temperature at a predetermined reaction temperature while supplying air or carbon dioxide gas and water vapor.

3. Resin Composition

Since the magnesium oxide powder has high thermal conductivity, when it is filled in a resin, the thermal conductivity of the resin composition and the resin molded article molded therewith can be enhanced as a thermally conductive filler. Hereinafter, the resin composition of the present invention (hereinafter, simply referred to as "the resin composition") will be described.

The type of resin of the resin composition can be appropriately set according to the use and the like, and for example, may be a thermoplastic resin such as a polyolefin type resin, a polyamide resin or a polyphenylene sulfide resin, or may be a thermosetting resin such as an epoxy resin, a phenol resin, a silicone resin, a urea resin, a melamine resin or an unsaturated polyester, or synthetic rubber such as silicone rubber, butyl rubber, butadiene rubber, acrylic rubber or urethane rubber. The blending amount of each component is 10 to 98 parts by mass of the magnesium oxide powder and 2 to 90 parts by mass of the resin when the total mass of the resin composition is 100 parts by mass. When the blending amount of the magnesium oxide powder is less than 10 parts by mass, the resin composition to be obtained tends to have low hydration resistance and thermal conductivity. When the blending amount of the magnesium oxide powder exceeds 98 parts by mass, the proportion of the magnesium oxide powder is increased, thus the production cost is increased, and also the ratio of the resin is relatively low, thus the resin characteristics are likely to deteriorate.

The resin composition can be produced by kneading the resin and the magnesium oxide powder by a known method. Also, the obtained resin composition can be formed into a resin molded article by molding by a known method such as extrusion molding, and working into a desired shape.

The resin composition can be applied to various members, and can be particularly preferably used to members to which high thermal conductivity and water resistance are required. Examples of such members include lamp socket and various electrical components, in the automobile field. Also, in the field of electronic equipment, examples of such articles include heat sink, die pad, printed wired board, parts for semiconductor packaging, parts for cooling fan, pickup parts, connector, switch, bearing, case housing, and the like.

The hydration resistance of the resin molded article obtained by molding the resin composition can be evaluated by the mass increase rate represented by the following formula (3) after holding under an environment of 121° C.-100% RH for 24 hours.

Mass increase rate=(Mass increase amount of magnesium oxide powder after holding/Mass of magnesium oxide powder before holding)×100 (%)   Formula (3)

The volume change of the resin molded article can be evaluated by the volume change rate represented by the following formula (4) after holding under an environment of 121° C.-100% RH for 24 hours.

Volume change rate=(Volume increase of resin molded article after holding/Volume of resin molded article before holding)×100(%)   Formula (4)

Since the magnesium oxide powder is excellent in whiteness, the resin molded article to be obtained can be also excellent in whiteness. When a transparent resin is used, the resin molded article has a value of the degree of whiteness (L*) as high as 50 or more, preferably 60 or more, and further preferably 70 or more. Also, the resin molded article has a value of red to green (a*) of −1.0 or more, and preferably −0.5 or more. Further, the resin molded article has a value of yellow to blue (b*) of 5 or less, and preferably 3 or less.

Examples

Hereinafter, the present invention is specifically described with reference to examples, but these examples do not limit the object of the present invention, and the present invention is not limited to these examples.

1. Production of Magnesium Oxide Powder and Evaluation of Reaction Rate

Example 1

A magnesium oxide raw material having a purity of 99.5% obtained by burning magnesium hydroxide as a raw material at 1800° C. for 30 minutes with a rotary kiln was pulverized and classified so as to have an average particle size of 26 μm and treated in a thermo-hygrostat (manufactured by ESPEC CORP., SH-642) in an environment of 35° C.-85% RH for 100 hours, then dried at 120° C. for 1 hour to produce magnesium oxide powder, and the reaction rate was measured. At this time, the mass increase rate between before and after treatment represented by the following formula (5) was defined as the reaction rate. The result is shown in Table 1.

Reaction rate=(Mass increase after treatment/Mass of magnesium oxide raw material before treatment)×100   Formula (5)

Comparative Example 1

Magnesium oxide powder was produced under the same conditions as in Example 1 except that the storage condition in the thermo-hygrostat was changed to 60° C.-60% RH, and evaluated. The result is shown in Table 1.

Comparative Example 2

Magnesium oxide powder was produced under the same conditions as in Example 1 except that the storage condition in the thermo-hygrostat was changed to 60° C.-85% RH, and evaluated. The result is shown in Table 1.

Comparative Example 3

Magnesium oxide powder was produced under the same conditions as in Example 1 except that the storage condition in the thermo-hygrostat was changed to 85° C.-85% RH, and evaluated. The result is shown in Table 1.

Comparative Example 4

Magnesium oxide powder was produced under the same conditions as in Example 1 except that the storage condition in the thermo-hygrostat was changed to 99° C.-85% RH, and evaluated. The result is shown in Table 1.

Comparative Example 5

The magnesium oxide raw material pulverized and classified in Example 1 was evaluated as it was. The result is shown in Table 1.

TABLE 1

Treatment Conditions

| | Moisture | Temperature (°C.) | Humidity (%) | Holding time (h) | Reaction rate (%) |
|---|---|---|---|---|---|
| Example 1 | — | 35 | 85 | 100 | 0.3 |
| Comparative Example 1 | — | 60 | 60 | 100 | 0.1 |
| Comparative Example 2 | — | 60 | 85 | 100 | 4.5 |
| Comparative Example 3 | — | 85 | 85 | 100 | 2.0 |
| Comparative Example 4 | — | 99 | 85 | 100 | 15.0 |
| Comparative Example 5 | Untreated | | | | — |

As shown in Table 1, when comparing Example 1 and Comparative Examples 1 to 4 with Comparative Example 5, the mass increase was observed by treating the magnesium oxide raw material, thus it was confirmed that the reaction between the magnesium oxide raw material and carbon dioxide with water was progressed. As a result of comparison of Comparative Example 1 with Comparative Example 2, it was found that when the humidity was lowered from 85% to 60%, the reaction efficiency of the magnesium oxide raw material with water was deteriorated.

2. Quantitative Evaluation of Surface Product (Measurement by EGA-MS Method)

As to the samples of Example 1, Comparative Example 1, and Comparative Examples 3 to 5, the constituents of the coating layer were quantitatively analyzed by the EGA-MS method. Measurement conditions by the EGA-MS method are as follows. The sample was heated at 10° C./min from 50° C. to 500° C. under a He gas atmosphere, using a heating furnace (PY-2020iD manufactured by Frontier Laboratories Ltd.), and the evolved gas was introduced into a mass spectrometer (QP-5000 manufactured by Shimadzu Corporation), then the evolved gas was analyzed. Quantitative analysis of $CO_2$ and $H_2O$ was carried out by preparing a calibration curve using calcium oxalate hydrate as a standard sample.

The obtained results are shown in Table 2.

TABLE 2

| | $CO_2$ (Molar fraction: %) | $H_2O$ (Molar fraction: %) |
|---|---|---|
| Example 1 | 40.2 | 59.8 |
| Comparative Example 2 | 6.9 | 93.1 |
| Comparative Example 3 | 1.3 | 98.7 |
| Comparative Example 4 | 2.6 | 97.4 |
| Comparative Example 5 | 22.0 | 78.0 |

In Example 1, $CO_2$ is about 40 mol % and $H_2O$ is about 60 mol %, thus it was found that the coating layer of Example 1 is almost composed of basic magnesium carbonate, and its composition is "$Mg_5(CO_3)_4(OH)_2 \cdot 5H_2O$". On the other hand, in Comparative Examples 1 to 5, $CO_2$ is less than 30 mol % and $H_2O$ is more than 70 mol %, thus the coating layer was found to be almost composed of magnesium hydroxide.

3. Scanning Transmission Electron Microscope and Electron Beam Diffraction

Figure 1B:
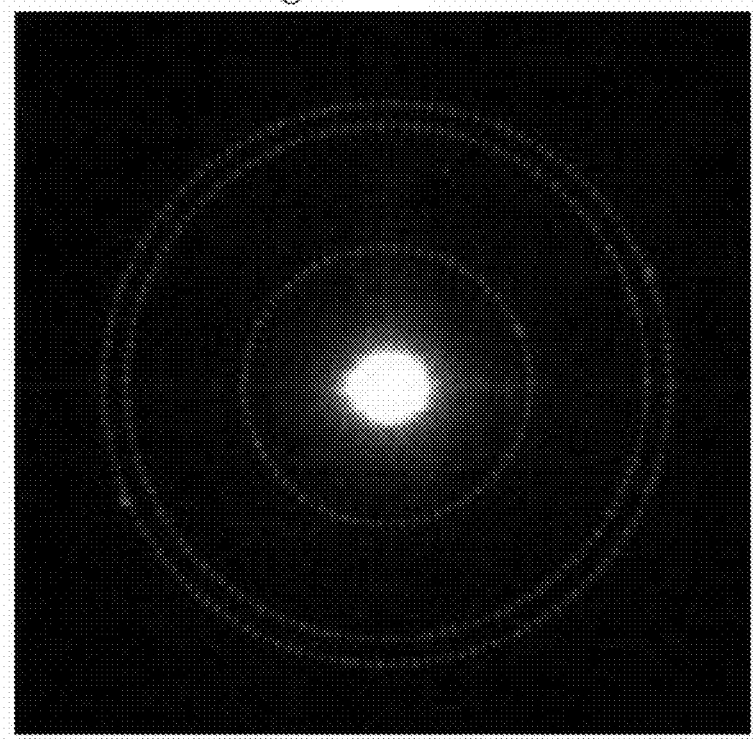
FIG. 1B is an electron beam diffraction image of a portion surrounded by a circle in FIG. 1A.

Components of the coating layer of the magnesium oxide powder of Example 1 were identified by dark field scanning transmission electron microscope observation and electron beam diffraction. First, a dark field image was taken at an acceleration voltage of 120 kV using a field emission transmission electron microscope JEM-2100F (manufactured by JEOL Ltd.) (FIG. 1A). Next, on the part of the coating layer of the magnesium oxide powder in the photograph, a diffraction image was obtained by the selected area electron beam diffraction with a camera length of 100 cm and a selected area of 140 nm. A concentric circle was drawn from the center about the points confirmed by the obtained diffraction image (FIG. 1B), and the product was identified. The identification results of the obtained main surface product are shown in Table 3.

TABLE 3

| | Surface product |
|---|---|
| Example 1 | Basic magnesium carbonate |
| Comparative Example 1 | Magnesium hydroxide |
| Comparative Example 2 | Magnesium hydroxide |
| Comparative Example 3 | Magnesium hydroxide |
| Comparative Example 4 | Magnesium hydroxide |
| Comparative Example 5 | None |

4. Film Thickness of Coating Layer

The film thickness of the basic magnesium carbonate generated on the particle surface layer of the magnesium oxide powder obtained in Example 1 was determined as follows. With volume V of the sphere determined from the average particle size, surface area S of the sphere, mass increase rate "a" between before and after treatment, a density of basic magnesium carbonate of 2.16 g/cc, a density of magnesium oxide powder of 3.58 g/cc, a molecular weight of basic magnesium carbonate ($Mg_5(CO_3)_4(OH)_2$) of 431.60 g/mol, a molecular weight of magnesium oxide (MgO) of 40.30 g/mol, a molecular weight of carbon dioxide ($CO_2$) of 44.01 g/mol, and a molecular weight of water ($H_2O$) of 18.02 g/mol, the film thickness of basic magnesium carbonate can be calculated by the following formula. For simplicity of calculation, it is not considered herein about crystal water.

[Mathematical Formula 1]

$$\text{Film Thickness} = a \times \frac{\dfrac{\text{Molecular amount of basic magnesium carbonate}}{4 \times \text{Molecular amount of carbon dioxide} + 3 \times \text{Molecular amount of water}}}{\text{Density of basic magnesium carbonate}} \times \frac{\text{Molecular amount of basic magnesium carbonate}}{100 - a \times \dfrac{\text{Molecular amount of basic magnesium carbonate}}{4 \times \text{Molecular amount of carbon dioxide} + 3 \times \text{Molecular amount of water}}} \times \frac{\text{Volume } V \text{ of sphere}}{\text{Surface area } S \text{ of sphere}}$$

Mathematical formula (1)

Further, the relationship between the volume V and the surface area S of the sphere can be represented by the following mathematical formula (2).

[Mathematical Formula 2]

$$\frac{\text{Volume } V \text{ of sphere}}{\text{Surface area } S \text{ of sphere}} = \frac{\frac{4}{3}\pi r^3}{4\pi r^2} = \frac{r}{3}$$

Mathematical formula (2)

Here, when a mass increase rate "a" between before and after treatment of 0.3% and an average particle size of 26 μm (measured by Microtrac HRA type manufactured by NIK-KISO CO., LTD.) were substituted into mathematical formula (1) to calculate the following mathematical formula (3), the film thickness was about 40 nm.

[Mathematical Formula 3]

$$\text{Film Thickness} = \frac{0.003 \times \dfrac{431.60}{4 \times 44.01 + 3 \times 18.02}}{100 - 0.003 \times \dfrac{431.60}{4 \times 44.01 + 3 \times 18.02}} \times \frac{13}{3} = 0.0406432$$

Mathematical formula (3)

5. Evaluation of Mass Increase Rate

For Example 1, Comparative Example 1 and Comparative Example 5, the mass increase rate at 152° C.-0.5 MPa for 3 hours was evaluated, based on the Gakushin method 4 (method for evaluating digestion characteristics of magnesia clinker). The results are shown in Table 4. From this result, it was found that, in Example 1, the mass increase decreased to 1/10 as compared with that in the untreated case (Comparative Example 5), and the hydration resistance was excellent.

TABLE 4

|  | Mass increase rate (%) at 152° C.-0.5 MPa-3 h |
|---|---|
| Example 1 | 2.1 |
| Comparative Example 1 | 6.4 |
| Comparative Example 5 | 25 |

6. Resin Molded Article and Evaluation Thereof

Resin compositions and resin molded articles were produced using the magnesium oxide powder obtained in Example 1, Comparative Example 1, and Comparative Example 5, and the evaluation was performed. First, 100 parts by mass of the magnesium oxide powder and 0.1 parts by mass of an antioxidant (Irganox 1010 manufactured by BASF SE) were mixed to 100 parts by mass of ethylene ethyl acrylate (ZE708 manufactured by UBE-MARUZEN POLYETHYLENE). Next, the mixture was kneaded at 140° C. using a heating roll (test roll manufactured by TOYO SEIKI Co., Ltd.) to obtain a resin composition. The obtained resin composition was pressed at 140° C. by a hot press to form a sheet of 120×120×1 mm, and a test piece of 50×50×1 mm was cut from a site where scratches and bubbles were not observed to prepare a resin molded product.

Four point color difference of a test piece obtained was measured using a color difference meter (ZE6000 manufactured by NIPPON DENSHOKU INDUSTRIES CO., LTD.), and averaged to obtain the degree of whiteness (L*), red to green (a*), and yellow to blue (b*), respectively. The thickness at four points and length of four sides of the obtained test piece were measured using a caliper, and "Volume=(Average value of thickness at four points)× (Square root of product of length of four sides)" was calculated. The test piece was placed on a vat manufactured by SUS Corporation, and the volume change rate and mass change rate after storage in an environment of 121° C.-100% RH for 24 hours were determined using a PCT tester (PC-242HSR type manufactured by HIRAYAMA MANUFACTURING CORPORATION). These results are shown in Table 5.

TABLE 5

|  | L* | a* | b* | Volume change rate (%) | Mass change rate (%) |
|---|---|---|---|---|---|
| Example 1 | 77.3 | −0.4 | 1.9 | 37 | 7 |
| Comparative Example 1 | 76.4 | −0.5 | 3.0 | 52 | 15 |
| Comparative Example 5 | 77.5 | −0.8 | 2.8 | 65 | 19 |

From this result, it was found that, in Example 1, red to green (a*) and yellow to blue (b*) both approached 0 while maintaining the degree of whiteness (L*) almost equivalent to Comparative Example 1 and Comparative Example 5, thus the color was improved as compared with Comparative Example 1 and Comparative Example 5. Further, it was found that, in Example 1, the volume change rate and the mass change rate were both greatly reduced as compared with Comparative Example 1 and Comparative Example 5, thus the resin molded article was excellent in hydration resistance.

The invention claimed is:

1. Magnesium oxide powder having a coating layer consisting essentially of basic magnesium carbonate in a surface layer, when the amounts of substances of water vapor and carbon dioxide among a gas generated by thermal decomposition at 50 to 500° C. are respectively designated as m-$H_2O$ and m-$CO_2$, in a heating evolved gas analysis of EGA-MS method, the molar fraction represented by m-$CO_2$/(m-$H_2O$+m-$CO_2$) being within the range of 0.3 to 0.6, and the basic magnesium carbonate is represented by formula m-$MgCO_3$—$Mg(OH)_2$-n$H_2O$ in which m is an integer of 3 to 5, and n is an integer of 3 to 8.

2. Magnesium oxide powder having a coating layer consisting essentially of basic magnesium carbonate in a surface layer, which is obtained by treating a magnesium oxide raw material, in the presence of carbon dioxide, at 30 to 45° C. and an atmosphere of relative humidity of 70 to 90% for 10 to 1000 hours, the basic magnesium carbonate being represented by formula m-$MgCO_3$—$Mg(OH)_2$-n$H_2O$ in which m is an integer of 3 to 5, and n is an integer of 3 to 8.

3. The magnesium oxide powder according to claim 1, wherein the average particle size is within the range of 0.1 to 300 μm.

4. A resin composition comprising the magnesium oxide powder as defined in claim 1.

5. A method for producing magnesium oxide powder having a coating layer consisting essentially of basic magnesium carbonate in a surface layer, comprising treating a magnesium oxide raw material, in the presence of carbon dioxide, at 30 to 45° C. and an atmosphere of relative humidity of 70 to 90% for 10 to 1000 hours, the basic magnesium carbonate being represented by formula m-$MgCO_3$—$Mg(OH)_2$-n$H_2O$ in which m is an integer of 3 to 5, and n is an integer of 3 to 8.

6. The method for producing magnesium oxide powder according to claim 5, wherein the magnesium oxide raw material has a purity of 98% or more.

7. The magnesium oxide powder according to claim 2, wherein the average particle size is within the range of 0.1 to 300 μm.

8. A resin composition comprising the magnesium oxide powder as defined in claim 2.

* * * * *